No. 693,762. Patented Feb. 18, 1902.
W. J. WARD.
CAR FENDER.
(Application filed Jan. 15, 1902.)

(No Model.)

Witnesses:
Inventor:
W. J. Ward.
By
Attorneys.

UNITED STATES PATENT OFFICE.

WILLIAM J. WARD, OF PITTSBURG, PENNSYLVANIA.

CAR-FENDER.

SPECIFICATION forming part of Letters Patent No. 693,762, dated February 18, 1902.

Application filed January 15, 1902. Serial No. 89,894. (No model.)

*To all whom it may concern:*

Be it known that I, WILLIAM J. WARD, a citizen of the United States of America, residing at Pittsburg, in the county of Allegheny and State of Pennsylvania, have invented certain new and useful Improvements in Car-Fenders, of which the following is a specification, reference being had therein to the accompanying drawings.

This invention relates to certain new and useful improvements in car-fenders, and has for its object the provision of novel means whereby the fender may be automatically lowered to the rails when an object comes in contact with the forward portion of the fender.

The invention further contemplates to provide a safeguard that will prevent all objects from being carried under the wheels, thereby preventing injury to persons coming in contact with the fender.

A still further object of the present invention is to provide a device of the above-described character that will be extremely simple in construction, strong, durable, comparatively inexpensive to manufacture, and highly efficient in its operation.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1:
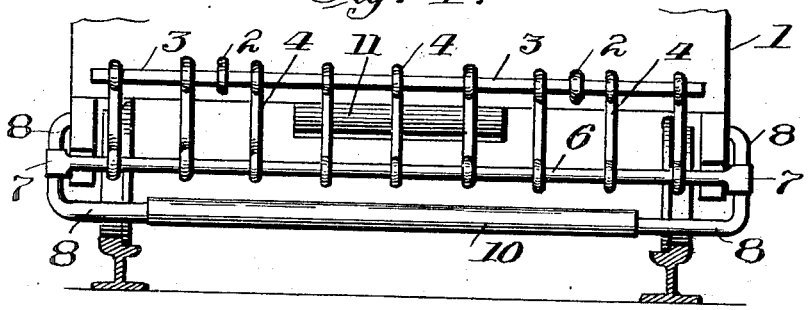
Figure 2:
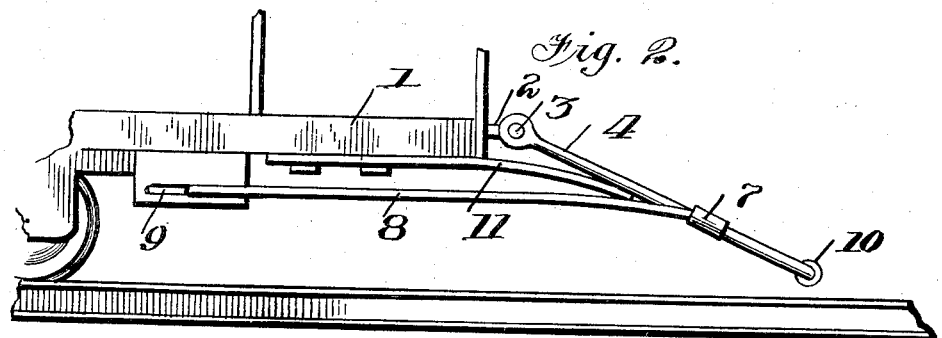
Figure 3:
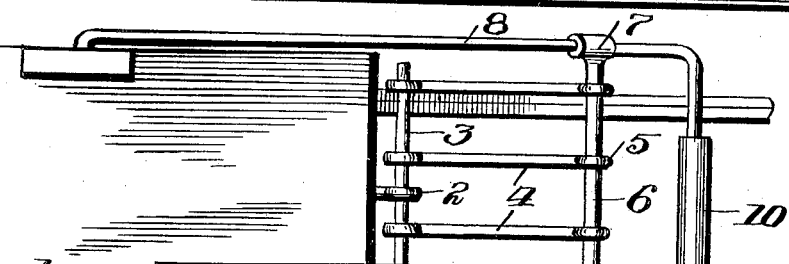

Figure 1 is a front view of my improved car-fender, showing the same attached to the front of a car. Fig. 2 is a side elevation thereof. Fig. 3 is an under plan view thereof.

In the drawings the reference-numeral 1 represents the platform of the car, to which is rigidly secured by means of hangers 2 the stationary shaft 3. To the said shaft are attached a series of links 4, forming a hinge connection, said links carrying at their other end eyes 5 to receive the shaft 6, which extends transversely to the car-body. To each end of the said shaft are formed collars 7 to receive the rods 8, forming the frame. These rods 8 extend radially into slotted guides 9, secured to the under face of the car-body. The rods 8 forming the frame, which extend a distance in front of the shaft 6, are provided with a sleeve 10 of rubber or other flexible material. A spring 11 is rigidly secured to the under face of the platform of the car and extends forwardly, engaging the under side of a number of the links 4, which spring serves to retain the forward portion of the fender a distance above the rails.

The operation of my improved fender is as follows: When the flexible sleeve comes in contact with the object, the links and shaft 6 will automatically lower, and the fender will pick up said object, preventing the same from coming under the car-body. The tension of the spring 11 is only sufficient to keep the forward end of the fender in a suspended position above the rails and serves to return the fender to its normal position after the object has been picked up.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

1. In a car-fender, the combination with a car, a stationary shaft secured to the forward end thereof, a series of links carrying a shaft, a frame, a flexible sleeve secured to the forward end of the frame, and a spring secured to the under face of the car-body engaging said links to normally elevate the forward portion of the frame, substantially as described.

2. In a car-fender, the combination with a car, a shaft secured to the forward end thereof, a series of links forming a hinge connection with said shaft, a shaft connected to the lower end of said links, forming a hinge connection therewith, a frame connected to said last-mentioned shaft, a flexible sleeve secured to the forward portion of said frame, slotted guides secured to said car, and the ends of said frame slidably connected in said guides, all parts being arranged and operating substantially as described.

In testimony whereof I affix my signature in the presence of two witnesses.

WILLIAM J. WARD.

Witnesses:
 JOHN NOLAND,
 E. E. POTTER.